United States Patent [19]

Takeuchi et al.

[11] Patent Number: 4,615,329
[45] Date of Patent: Oct. 7, 1986

[54] SOLAR HEAT COLLECTOR ARRANGEMENT

[75] Inventors: Hirosato Takeuchi; Katsunobu Kishi; Toshio Mikiya, all of Tokyo, Japan

[73] Assignee: Nitto Kohki Co., Ltd., Tokyo, Japan

[21] Appl. No.: 472,837

[22] Filed: Mar. 7, 1983

[30] Foreign Application Priority Data

Mar. 7, 1982 [JP] Japan .......................... 57-31802[U]

[51] Int. Cl.[4] .............................................. F24J 2/10
[52] U.S. Cl. .................................. 126/438; 126/443; 126/417
[58] Field of Search ............... 126/443, 448, 450, 438, 126/439, 424

[56] References Cited

U.S. PATENT DOCUMENTS

| | | | |
|---|---|---|---|
| 3,905,352 | 9/1975 | Jahn | 126/400 |
| 4,043,318 | 8/1977 | Pei | 126/443 |
| 4,080,954 | 3/1978 | de Wilde et al. | 165/180 |
| 4,091,796 | 5/1978 | Bieringer et al. | 126/438 |
| 4,120,285 | 10/1978 | Nugent | 126/448 |
| 4,155,346 | 5/1979 | Aresty | 126/443 |
| 4,155,347 | 5/1979 | Heller et al. | 126/424 |
| 4,232,655 | 11/1980 | Frissora et al. | 126/443 |
| 4,306,540 | 12/1981 | Hutchinson | 126/424 |
| 4,335,709 | 6/1982 | Slaats | 126/443 |
| 4,346,694 | 8/1982 | Moan | 126/443 |
| 4,364,373 | 12/1982 | Takeuchi et al. | 126/443 |
| 4,413,617 | 11/1983 | Dunlap et al. | 126/443 |
| 4,426,996 | 1/1984 | Ure et al. | 126/443 |
| 4,427,838 | 1/1984 | Goldman | 126/450 |
| 4,475,536 | 10/1984 | Dame | 126/438 |

FOREIGN PATENT DOCUMENTS

| | | | |
|---|---|---|---|
| 2376378 | 9/1978 | France | 126/438 |
| 594215 | 12/1977 | Switzerland | 126/424 |
| 325179 | 2/1930 | United Kingdom | 126/438 |
| 2030283 | 4/1980 | United Kingdom | 126/443 |

*Primary Examiner*—Samuel Scott
*Assistant Examiner*—H. A. Odar
*Attorney, Agent, or Firm*—Birch, Stewart, Kolasch & Birch

[57] ABSTRACT

A solar heat collector arrangement including at least one straight-tubing type solar heat collector and first and second frame members for supporting the straight-tubing type solar heat collector. A reflector mirror is provided for directing sunrays into the heat collector. The first frame member includes a round mount opening for receiving one end of the heat collector and the second frame member includes a semi-circular groove for receiving the other end of the heat collector. Resilient annuluses are mounted on each end of the heat collector for protecting the heat collector. The heat collector, the resilient annuluses and the reflector mirror are fitted one upon another into the opening in the first frame member and on the groove in the second frame member. A retainer is provided for holding the resilient annulus and the reflector mirror from above, the retainer is mounted for detachably connecting the heat collector relative to the first and second frame members.

5 Claims, 8 Drawing Figures

SOLAR HEAT COLLECTOR ARRANGEMENT

BACKGROUND OF THE INVENTION

1. Field of the Invention

This invention relates to a solar heat collector arrangement including a plurality of reflector mirrors, which are adjustable with respect to an angle of inclination, and a simplified structure for supporting a plurality of solar heat collectors.

2. Description of Background Information

A conventional mechanism for turning reflector mirrors for directing sunrays used with solar heat collectors comprises a linkage or gear mechanism which is complicated due to a considerable number of the parts required to operate the mechanism. Once rusted, the mechanism does not work well and, with the lapse of time, renders the mirror device useless.

Further, such mirror-turning mechanisms are often out of order due to the considerable number of the parts required which results in a rather complicated structure and an increase in costs. Thus, there is a great deal to be desired with respect to material savings.

In addition, since some metal parts are in direct contact with the heat collectors, the collectors are prone to damage. This construction is one cause for a reduction in the service life of the prior art collector arrangements.

SUMMARY AND OBJECTS OF THE INVENTION

A main object of this invention is to eliminate the prior art drawbacks by the provision of a novel solar heat collector arrangement wherein the number of the parts required can be decreased to simplify construction.

Another object of the present invention is to provide a solar heat collector arrangement wherein the angle of inclination of the reflector mirrors can be adjusted at discretion, if required.

Further, the heat collectors of the present invention can be supported in place without bringing them into contact with the surface of metal parts to enable the arrangement to be used over an extended period.

Appreciable improvements are introduced by the present invention in the efficiency of both the mirrors and the arrangement.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Brief Description of the Drawings

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
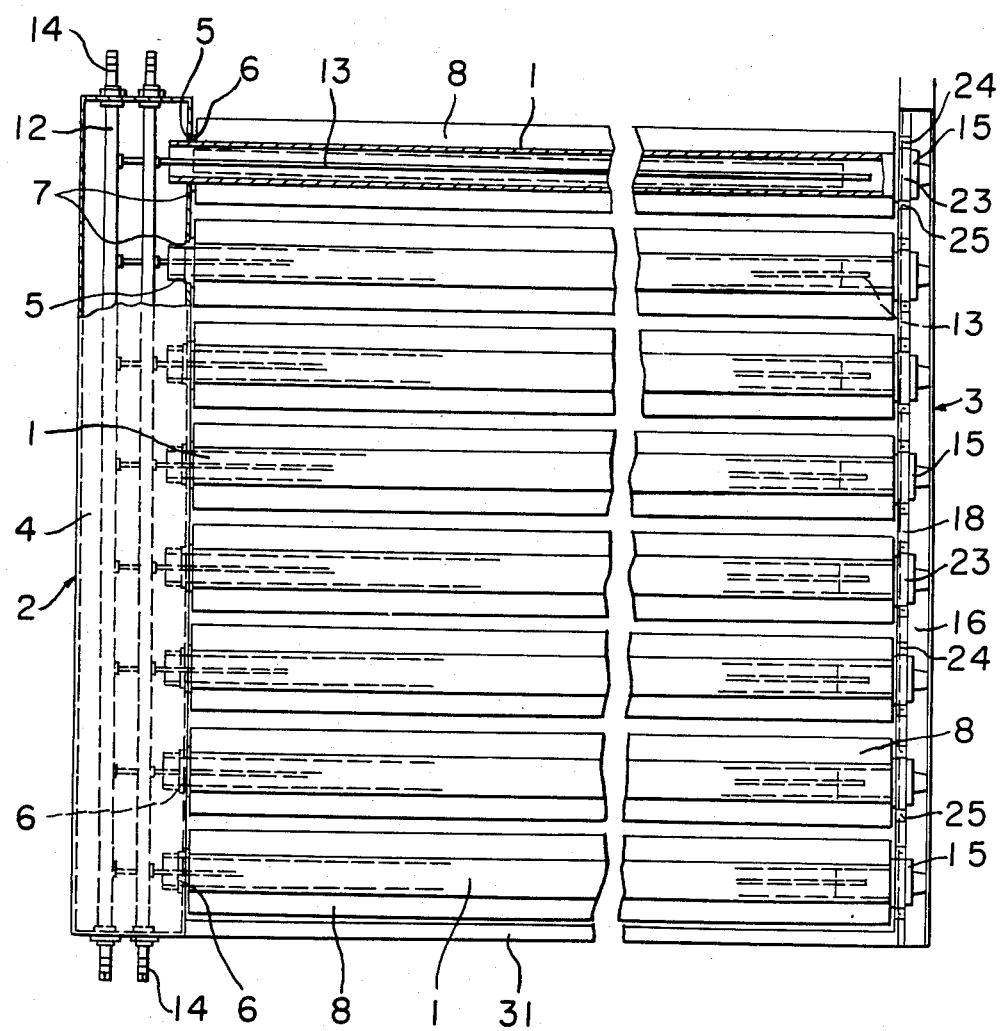
FIG. 1 a plan view showing one embodiment of this invention, wherein the middle portion thereof, as viewed in the lengthwise direction of the heat collectors, is omitted.
Figure 2:
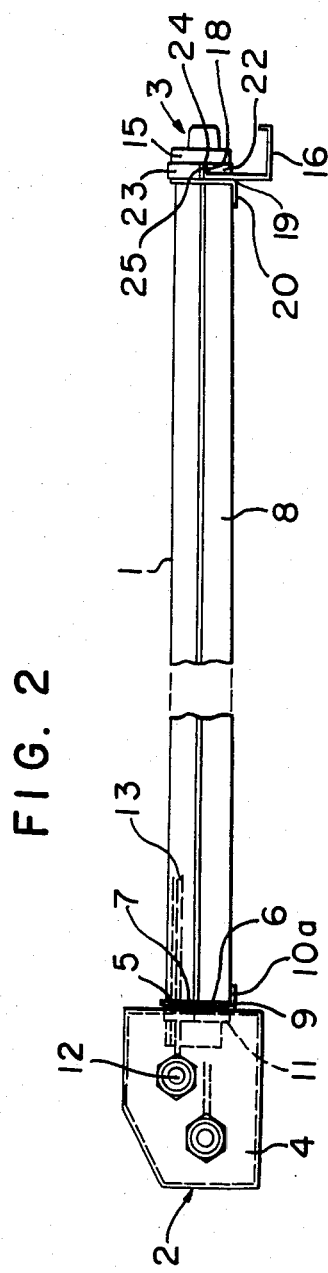
FIG. 2 is a side view of the embodiment illustrated in FIG. 1.
Figure 3:
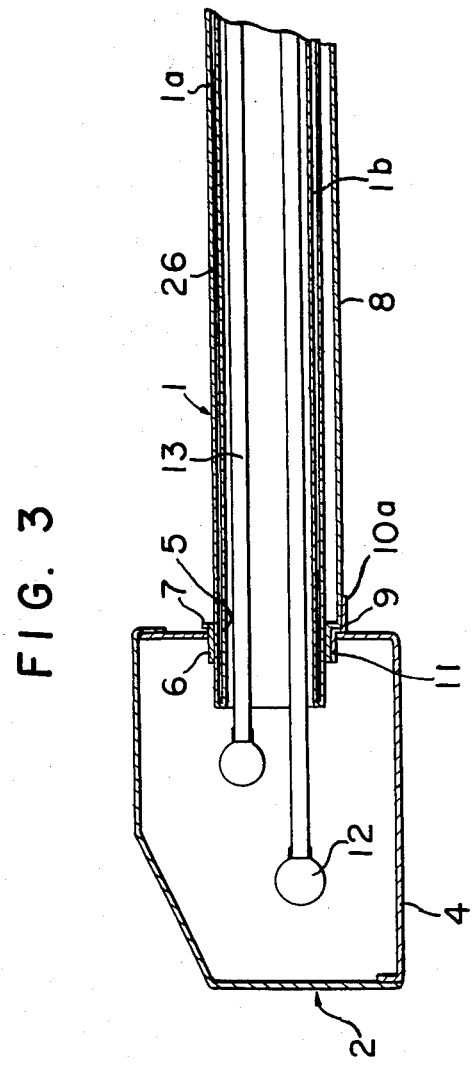
FIG. 3 is an enlarged, longitudinally sectioned view of the header side of the embodiment illustrated in FIG. 1.

Referring to FIGS. 1-3, a straight-tubing type solar heat collector 1 (hereinafter referred to as the heat collector) includes an outer glass tube 1a having an open end and a closed end and an inner glass tube 1b having an open end and a closed end. The open end of the heat collector 1 is located on the side of a header of a solar heat collector arrangement and the closed end is located on the side of a tail thereof. In the embodiment illustrated in FIG. 1, the heat collector arrangement includes a set of eight heat collectors 1 arranged in parallel with one another and fixed to frames 4 and 16 in the manner described below.

Reference will first be made to the mechanism for supporting the header side of a reflector mirror 8.

The frame 4 is provided on one side, as viewed in its lengthwise direction, with round mount openings 5 corresponding in number to the number of the collectors 1. The round mount openings 5 have a diameter larger than the diameter of the heat collectors 1.

A rubber annulus 6 is fitted into each mount opening 5, which functions as a resilient annulus for the protection of the open end of each heat collector 1. The resilient ring 6 includes an outward flange 7, as will be understood from FIG. 3. The above-mentioned rubber annulus may be substituted with a like member formed of other material having a relatively high coefficient of friction.

Figure 5:
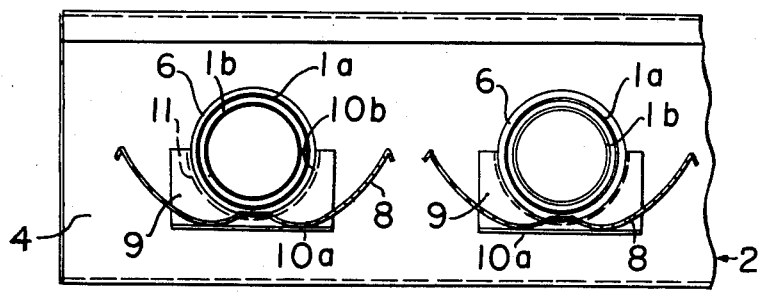
FIG. 5 is a longitudinally sectioned view, as viewed from the direction of FIG. 3.
Figure 6:
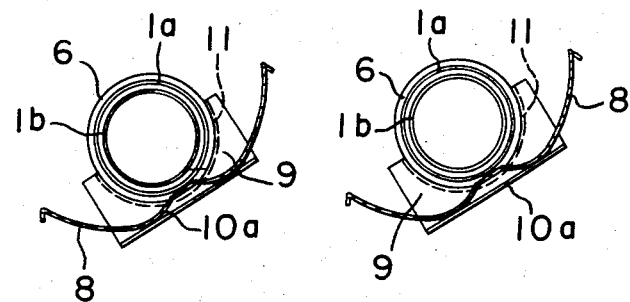
FIG. 6 is a longitudinally sectioned view showing the reflector mirror during turning.
Figure 7:
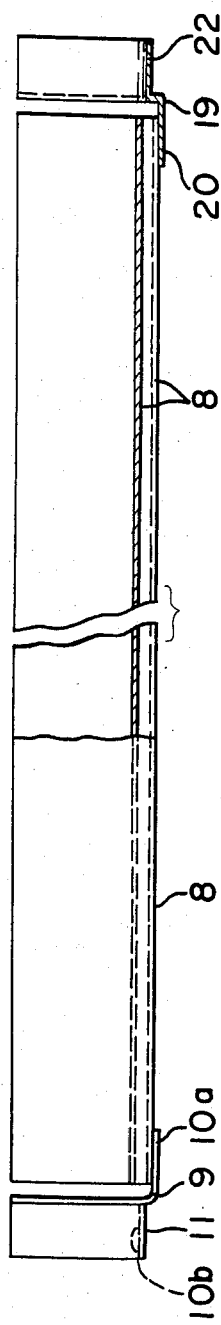
FIG. 7 is a side view showing the reflector mirror wherein the middle portion thereof, as viewed from the lengthwise direction, is omitted.

The reflector mirror 8 is of a substantially involute shape in section, and has a length corresponding to that of the heat collector 1. The mirror is fixed at the lower bottom of its end to a stay 9 by suitable means such as welding. The stay 9 is rotatably fitted into the frame 4. As depicted in FIG. 5, the stay 9 includes a lateral flange 10a for supporting the reflector mirror 8.

The stay 9 is notched at 10b on its upper surface. In this embodiment, the notch 10b may be of a semi-circle in section and have a diameter equal to the outer diameter of the resilient annulus 6. The stay 9 also includes a semi-circular insert 11 which is positioned in concentrical relationship to the notch 10b and extends in the direction away from the flange 10a. The insert 11 is disposed between the mount opening 5 and the resilient annulus 6, and is rotatable either clockwise or counterclockwise within the opening 5.

A header pipe 12 is in communication with a pipe 13 which is arranged within each heat collector 1 for the circulation of a heat medium. The header pipe 12 is provided with a joint 14 which communicates with a hot water supply pipe or an adjacent solar heat collector arrangement.

The mechanism for turning the tail side of the reflector mirror 8 will be explained hereinafter.

A rubber cap 15 is provided having a relatively high coefficient of friction. The rubber cap 15 is positioned on the closed end of the collector 1 and serves as a resilient covering to protect the closed end of the collector 1. The resilient cap 15 is partly provided on its outer surface with a groove 15a, and an outwardly projecting flange 15b.

An L-shaped frame 16 is located on the side of the tail of the collector arrangement. The frame 16 is provided in its vertical portion with a semi-circular groove 17 for rotatably supporting the resilient cap, and includes a lateral flange 18.

Figure 8:
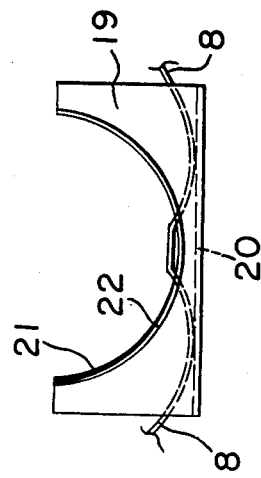
FIG. 8 is a front view showing the reflector mirror.

A stay 19 for rotatably mounting the tail-side end of the reflector mirror 8 is provided which includes a flange 20 on one side to fix the tail-side end. As shown in FIG. 8, the stay 19 is provided on its other side with a notch 21 having a diameter equal to the outer diameter of the resilient cap (or rubber cap) 15. A semi-circular insert 22 is located in concentrical relation to the notch 21 and is disposed between the resilient cap (or rubber cap) 15 and the semi-circular groove 17. Like the insert 11, the insert 22 is also rotatable either clockwise or counterclockwise within the groove 17.

A semi-circular retainer 23 is fitted from above into the groove 15a in the resilient annulus 15. The retainer 23 is formed with flanges 24 by bending both of its ends outwardly. The flanges 24 are fixed to the flange 18 by means of a bolt 25 to prevent undesirous turning of the resilient annulus 15, the heat collector 1 and the reflector mirror 8.

Figure 4:
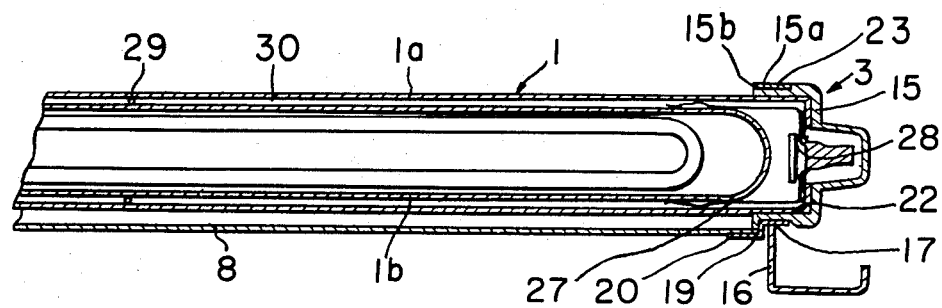
FIG. 4 is an enlarged, longitudinally sectioned view of the tail side of the embodiment illustrated in FIG. 1.

Referring to FIGS. 1, 3 and 4, a selective absorption film 26 is applied over the surface of the inner tube 1b by vapor deposition. A spacer fitting 27 including a getter metal 28 is provided on the closed end of the inner tube 1b. A spring ring 29 is included to space the inner tube 1b relative to the outer tube 1a. An insulating layer of vacuum 30 is provided in the spaced formed between the inner and the outer tubes 16, 1a. A connecting rod 31 is mounted between the frames 4, 16.

In assembling the foregoing embodiment, the resilient annulus 6 and resilient cap (or rubber cap) 15 are fitted in advance onto the open and closed ends of the heat collector 1. The reflector mirror 8 is supported in a horizontal state by positioning the insert 11 of the stay 9 into the mount opening 5 in the frame 4. Thereafter, the insert 22 of the stay 19 is positioned on the semi-circular notch 17 in the frame 16. Subsequently, the heat collector 1 is horizontally supported on the frames 4 and 16 by inserting the heat medium-circulating pipe 13 (communicating with the header pipe 12) through the open end of the collector 1, fitting the resilient annulus 6 (located on the open side of the collector 1) into the round mount opening 5, and placing the resilient cap (or rubber cap) 15 (fixed on the closed end of the collector 1) on the semi-circular groove 17 in the frame 16.

After the solar heat collector is assembled according to the present invention, the direction of the reflector mirror 8 can be adjusted in this state. The reflector mirror 8 is released by loosening the bolt 25 threaded into the retainer 23, so that the inserts 11 and 22 of both stays 9 and 19 slide between the opening 5 and the groove 17 and the resilient annulus 6 and resilient cap (or rubber cap) 15 while turning around the axis of the heat collector 1. It is thus possible to locate the reflector mirror 8 in the desired direction that is most effective with respect to heat collection. Thereafter, the reflector mirror 8 is secured in the predetermined direction by fastening the retainer 23 with the bolt 25.

The present invention provides a solar heat collector arrangement including a straight-tubing type solar heat collector 1 and first and second frames 4, 16 for supporting the heat collector 1. A reflector mirror 8 is provided for directing sunrays. The first frame 4 is provided with a round mount opening 5 for mounting said heat collector 1. The second frame 16 is provided with a semi-circular groove 17 for mounting the heat collector 1. Resilient annulus 6 and resilient cap 15 are provided for the protection of both end of said heat collector 1. The resilient annulus 6 and resilient cap 15 and the reflector mirror 8 are fitted, with one upon another, into the opening 5 and groove 17. The heat collector 1 is detachably formed at the end associated with said second frame 16 with a retainer 23 which holds the resilient annulus 6 and resilient cap 15 and the reflector mirror 8 from above.

According to the present invention, the angle of inclination of the reflector mirror 8 can be easily adjusted. For example, it is possible to secure the reflector mirror 8 in the desired direction that is most effective in view of reflection efficiency with great ease while installing the collector arrangement on the roof or wall of a building or house. More over, the means for turning the reflector mirror 8 has a limited number of parts and is thus of a very simplified structure wherein the reflector mirror 8 is supported by the resilient annulus 6 and resilient cap 15. This assures that the inventive arrangement can be used over an extended period with no fear of any trouble, and assembled at a relatively low cost.

In addition, since both ends of the heat collector 1 are securely held by the resilient annulus 6 and resilient cap (or rubber cap) 15 which also hold the reflector mirror 8 in association with the frames 4 and 16 by use of frictional forces, the reflector mirror 8 does not rock or oscillate due to vibrations, once secured. Since the reflector mirror 8 is restrained from undesirous movement during turning, the fine adjustment of the angle of inclination of the mirror can be effected easily. Replacement of the heat collector with a new one can easily be performed by merely removing the retainer.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A solar heat collector arrangement comprising:
   at least one straight-tubing type solar heat collector having a first end and a second end;
   a substantially resilient annulus fitted over the first end of the heat collector for protecting the heat collector;
   a substantially resilient cap fitted over the second end of the heat collector for protecting the heat collector;
   a first frame having a round mount opening for receiving the first end of the heat collector with the substantially resilient annulus fitted thereover;
   a second frame having a generally semi-circular groove for receiving the second end of the heat collector with the substantially resilient cap fitted thereover;

a reflector mirror for directing sunrays onto said heat collector, said mirror having a first end and a second end fixed to a first stay and a second stay, respectively, said first and second stays each having an arcuate insert extending therefrom, the arcuate inserts of the first and second stays being rotatably received between said round mount opening of the first frame and said substantially resilient annulus and between said semi-circular groove of said second frame and said substantially resilient cap, respectively, to support the first and second stays and said reflector mirror angularly adjustably relative to said first and second frames; and a strap-like retainer selectively unfastened and fastened to said second frame for initially permitting manual adjustment of said solar heat collector and said reflector mirror relative to the frames and subsequently holding said substantially resilient cap from above to releasably clamp the arcuate insert to said second stay between the substantially resilient cap of the heat collector and the semi-circular groove of the second frame for preventing rotation of the reflector mirror relative to the frames.

2. A solar heat collector according to claim 1, wherein said first and second frames include a plurality of substantially round openings and substantially semi-circular grooves for mounting a plurality of heat collectors in side-by-side relationship.

3. A solar heat collector according to claim 1, wherein each of said resilient annulus and cap includes a flange portion formed on an exterior portion thereof.

4. A solar heat collector according to claim 3, wherein said flange portion of the resilient annulus positioned adjacent to said first frame prevents longitudinal movement of said heat collector.

5. A solar heat collector according to claim 3, wherein said flange portion of the resilient cap positioned adjacent to said second frame provides an engagement member for positioning said retainer.

* * * * *